United States Patent [19]
Firtz et al.

[11] 3,745,358
[45] July 10, 1973

[54] ALIGNMENT METHOD AND APPARATUS FOR ELECTRON PROJECTION SYSTEMS
[75] Inventors: Richard B. Firtz, Thousand Oaks; William R. Livesay, Camarillo; Malcolm E. Wing, Agoura, all of Calif.
[73] Assignee: Radiant Energy Systems, Inc., Newbury Park, Calif.
[22] Filed: May 10, 1971
[21] Appl. No.: 141,837

[52] U.S. Cl. .................... 250/365, 29/578, 250/397
[51] Int. Cl. .......................................... H01j 37/26
[58] Field of Search ................. 250/49.5, 49.5 TE; 156/16, 17, 3; 29/578, 579

[56] References Cited
UNITED STATES PATENTS
| | | | |
|---|---|---|---|
| 3,519,788 | 7/1970 | Hatzakis | 250/49.5 TE |
| 3,448,280 | 6/1969 | Blitchington et al. | 219/124 |
| 3,569,718 | 3/1971 | Borner | 29/579 |
| 3,112,391 | 11/1963 | Sciaky | 250/49.5 TE |
| 3,475,097 | 10/1969 | Bishop et al. | 29/578 |

OTHER PUBLICATIONS
"Automatic Pattern Positioning of Scanning Electron Beam Exposure" by Miyauchi et al., IEEE Transactions on Electron Devices, Vol. Ed.-17 No. 6 (June 1970).

Primary Examiner—James W. Lawrence
Assistant Examiner—Harold A. Dixon
Attorney—Spensley, Horn & Lubitz

[57] ABSTRACT

An alignment method and apparatus for electron projection systems whereby the electron image may be automatically aligned with respect to the surface of the article on which the electron image is to be projected. The article to receive the electron image is provided with reference holes perpendicular to the surface which is to receive the electron image and extending through the article. Electron beams are first directed only to the general vicinity of the reference holes and are deflected by the deflection means for the electron beam so as to scan the general vicinity of the holes. A sensor is located in the apparatus beneath each of the holes to detect the electron beam passing through the holes, and is coupled to a computer controlling the beam deflection so as to provide information to the computer regarding the intensity of the electron beam passing through the alignment holes. The computer is programmed to control the beam and to operate on the information obtained from the sensor so as to determine the proper deflection means control signal for aligning the electron image with respect to the reference holes. Various scanning methods and beams of various characteristics are disclosed.

21 Claims, 13 Drawing Figures

PRIOR ART

Patented July 10, 1973

RICHARD B. FRITZ
WILLIAM R. LIVESAY
MALCOLM E. WING
INVENTOR.

BY

ATTORNEYS

Patented July 10, 1973 3,745,358

RICHARD B. FRITZ
WILLIAM R. LIVESAY
MALCOLM E. WING
INVENTOR

BY
*Spensley Horn, & Lubitz*
ATTORNEYS

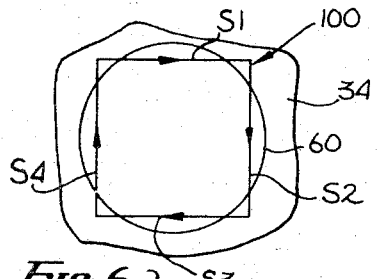
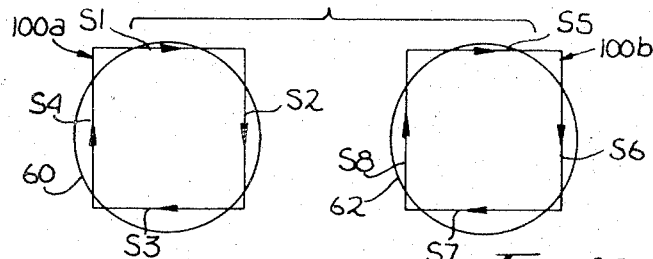
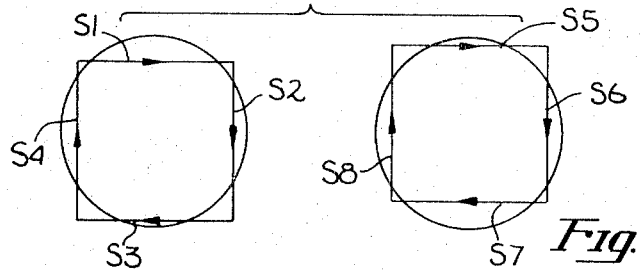
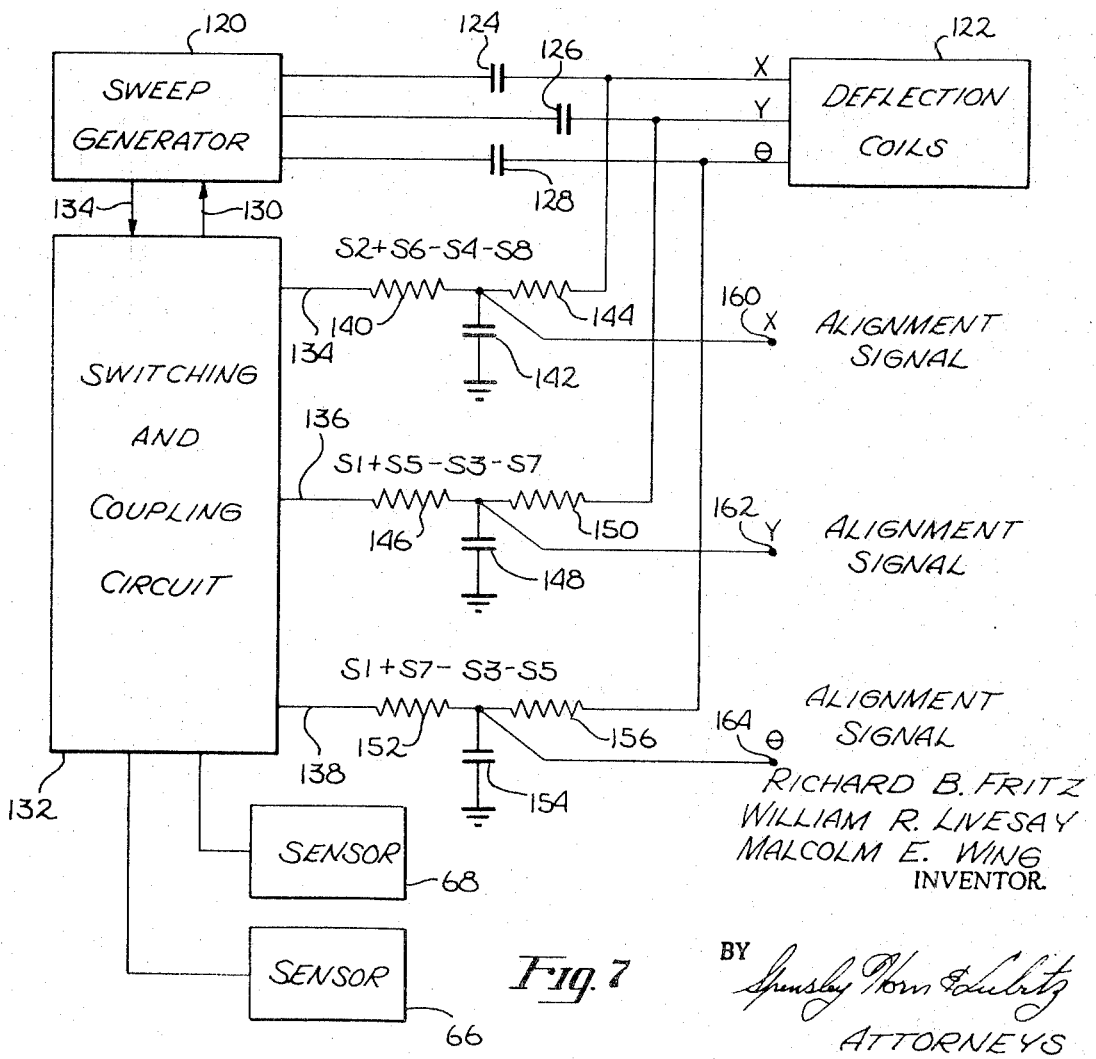

Patented July 10, 1973

RICHARD B. FRITZ
WILLIAM R. LIVESAY
MALCOLM E. WING
INVENTOR.

BY
*Spensley, Horn & Lubitz*
ATTORNEYS

ALIGNMENT METHOD AND APPARATUS FOR ELECTRON PROJECTION SYSTEMS

BACKGROUND OF THE INVENTION

1. Field of the Invention

The present invention relates to the field of electron beam projection systems, and particularly to methods and apparatus for aligning the electron beam image to reference marks on the article being exposed to the electron beam image.

2. Prior Art

Electron image projection is now being used in certain fabrication applications, which heretofore used the older and more conventional photolithographic processes, because of certain inherent advantages in electron image projection over optical projection and contact printing processes. By way of example, in the fabrication of semiconductor devices, and particularly integrated circuits, it is necessary to etch patterns in an oxide or other layer covering the semiconductor substrate at various stages of the processing of the substrate. Heretofore this has generally been done by coating the oxide layer with a photosensitive material and exposing the photosensitive material to a light source through a mask having the desired pattern thereon. The photosensitive material is then developed and either the exposed or the unexposed portion of the photoresist is dissolved away, depending upon the type of photoresist used, to expose the desired areas of the silicon oxide or other layer thereunder. In order to achieve the desired edge definition in the image in the photoresist, contact printing processes are generally used, with the mask physically and visually aligned with respect to the substrate to achieve the desired image placement. Such contact printing processes result in rapid mask wear and consequently the masks must be very frequently replaced in order to maintain the required image quality. Also, the physical and visual alignment of the mask with respect to the substrate is time consuming and subject to error.

Electron image projection has been used more recently on a limited basis to replace the older photolithographic processes where a high quality and finely detailed image is required, such as in integrated circuit production. In such applications, the principal inherent advantages of electron image projection are better resolution, non-contact printing, and electrically controllable mask alignment. The higher resolution and the ability to achieve the required resolution through a non-contact printing process results from the fact that if electrons are emitted from a mask surface with a low energy level, and accelerated toward an electron resist on a substrate by a relatively high electric field, very little transverse electron scattering will occur, thereby resulting in a projected electron image of high quality and fine resolution. The alignment advantages result from the fact that electron beams may be readily deflected, either magnetically or electrostatically, so that the projected electron image may be readily rotated or translated by small amounts to accurately align the image with respect to the substrate.

Electron image projection is achieved through the use of a mask adapted to emit electrons in a pattern from the surface of the mask. Typically, the mask is comprised of a glass plate having a titanium dioxide mask surface deposited to one side of the plate and a thin layer of palladium deposited over the titanium dioxide mask. When the mask is illuminated from the back side with ultraviolet light, the palladium emits electrons with an energy of approximately 0.2 electron volts. Since the titanium dioxide masks the ultraviolet light from the palladium, only the area of the palladium not masked from the ultraviolet light by the titanium dioxide emits the electrons. The emitted electrons are then accelerated by an electric field to the electron resist coated substrate, typically through a voltage rise of perhaps 10,000 volts so that the 0.2 electron volts energy in the electrons, as emitted, will not result in excessive projected image degradation (loss in image sharpness due to lateral translation and confusion of electrons during their time of travel to the surface of the electron resist).

Accurate physical alignment of the titanium dioxide mask with respect to the substrate would be extremely difficult since the electron image projection process must be carried out in a vacuum to avoid scattering of electrons from collision with gas molecules. However, the projected image may be rotated or translated magnetically in small but readily controllable amounts by such means as properly placed deflection coils so as to impose appropriate magnetic fields within the paths of travel of the electrons. The problem, however, is one of determining the image deflections required to properly align the image on the substrate. It is this problem to which the present invention is directed.

In the prior art, the alignment was achieved as follows: starting with a silicon wafer with a silicon-oxide layer covering the surface thereof, a star pattern is etched part way through the silicon-oxide layer near the edge of the wafer. Then, a thin layer of aluminum is deposited over the silicon-oxide surface in the star pattern and in the vicinity around the star pattern and electrical contact is made to the layer of aluminum and to the silicon substrate. Also, each mask is adapted to project an electron image with a similar star pattern to the vicinity of the star pattern on the silicon-oxide layer on the substrate. The layer of aluminum is made extremely thin so that the projected electron image will substantially pass therethrough and into the silicon-oxide layer thereunder. Since electron bombardment of a silicon-oxide layer induces an electrical conductivity in the silicon-oxide which is inversely proportional to the thickness of the oxide layer, the conductivity, as measured between the layer of aluminum and the silicon substrate, may be used as an indication of the position of the electron star pattern image on the masks with respect to the star pattern in the silicon-oxide layer. Thus, by imposing a voltage between the substrate and the layer of aluminum, the deflection of the electron image may be controlled so as to move the projected star pattern in accordance with the conductivity of the silicon-oxide layer. The conductivity of the oxide layer will be a maximum when the electron star pattern image is projected directly in alignment onto the star pattern etched part way through the silicon-oxide layer and thus, the deflection coils are properly excited when both translational and rotational deflection perturbations result in a decrease in the conductivity of the oxide layer, as measured by the current flowing through the oxide layer between the aluminum layer and the substrate.

A number of problems exist in this prior art method of aligning the projected image to the substrate. These problems arise primarily because of the fact that the sensor for detecting the position of the reference image with respect to the reference pattern in the oxide layer is attached both to the substrate itself and to the thin aluminum layer on the surface of the oxide. Consequently, each article being processed must have such a sensor thereon, and any failure or malfunction of the sensor, say be failure of the electrical contact with the layer of aluminum, will result in failure of the alignment method, thereby preventing further processing of the substrate. Furthermore, as the wafer is processed, the aluminum layer is destroyed and must be reformed. The forming of the aluminum layer involves numerous additional processing steps which must be repeated each time the sensor is reformed.

It has been found in practice that an oxide coating of an order of 10,000 angstroms thick must be used in order to reduce the pin hole density to a usable level, and in conjuction with this requirement, a very small aluminum pad area on the order of 0.040 inches by 0.100 inches must be used to avoid shorting of the aluminum to the silicon wafer. The characteristics of the aluminized pad are critical in the alignment and, of course, care must be exercised to avoid aluminizing the edge of the substrate avoid shorting the aluminum to the silicon at that point. The sensor itself requires two contact to the aluminum pad and one contact to the silicon substrate, thus requiring the removal of the oxide from the back of the wafer. As a result of these problems, the yield with the prior art method is poor, resulting in a loss of approximately 20 percent due to the malfunction of the sensor alone. Also, the current in the prior art sensor is very low, thereby limiting the gain of the alignment system. Finally, the capacitance between the aluminum pad and the silicon substrate results in a substantial time constant for the sensor, causing a substantial lag in the system and slowing down the rates at which alignment is achieved. Thus, the forming and reforming of the sensor, in conjunction with the above operational problems with the sensor, makes the prior art method unacceptable.

BRIEF SUMMARY OF THE INVENTION

An alignment method and apparatus for electron projection systems whereby the electron image may be automatically aligned with respect to the surface of the article on which the electron image is to be projected. The projection systems uses a mask which, when illuminated with ultraviolet light, emits electrons in a pattern at a low energy level. The electrons are accelerated through a strong electric field to impinge on the surface of the article in the same pattern as emitted from the mask. The mask and the ultraviolet light source are also adapted to cause electron beams to be first directed toward alignment holes in the article for determining the deflection signals to be applied to the projection system for aligning the subsequently projected electron image. Sensors are located in the apparatus beneath each of the alignment holes to detect an electron beam passing therethrough and are coupled to a computer controlling the beam deflection so as to provide information to a computing means regarding the intensity of the electron beams passing through the alignment holes. The system is adapted to first cause electron beams to generally scan the vicinity of the holes and, once the general position of the holes is determined, to scan the holes in a predetermined manner so that the signals from the sensors may be combined with the beam deflection signals to determine the proper deflection signals for aligning the electrons image with respect to the reference holes.

The sensors located below the reference holes may be any of a number of different types of sensors, such as, by way of example, resistive devices rendered more conductive by the exposure to an electron beam, or may be a device directly sensing the current in the electron beam. Similarly, the sensors may be similar in construction to a photomultiplier tube, being adapted to greatly multiply the current in the electron beam by the secondary emission through a series of plates in the multiplying device.

The means controlling the scanning of the electron beams, and for determining the deflection signals for alignment of the electron image, may be such means as a digital computer coupled to a digital to analog converter, or a form of analog computer coupled to a sweep controlling means. Similarly, various schemes for sweeping the alignment holes and for determining the proper deflection signals for aligning the electron image are disclosed.

BRIEF DESCRIPTION OF THE DRAWINGS

FIG. 6a is a top view of one of the alignment holes illustrating an alternate scan sequence for determining the position of the center of the alignment hole.

FIG. 6b is a top view of two alignment holes illustrating the relative scan lengths for a vertical misalignment of the scan patterns with respect to the alignment holes.

FIG. 6c is a top view of two alignment holes illustrating the relative scan lengths for an angular misalignment in the scan patterns with respect to the alignment holes.

FIG. 7 is a block diagram of an analog computing means for automatically centering the sweep patterns of FIGS. 6a through 6c with respect to the alignment holes.

DETAILED DESCRIPTION OF THE INVENTION

Figure 1:
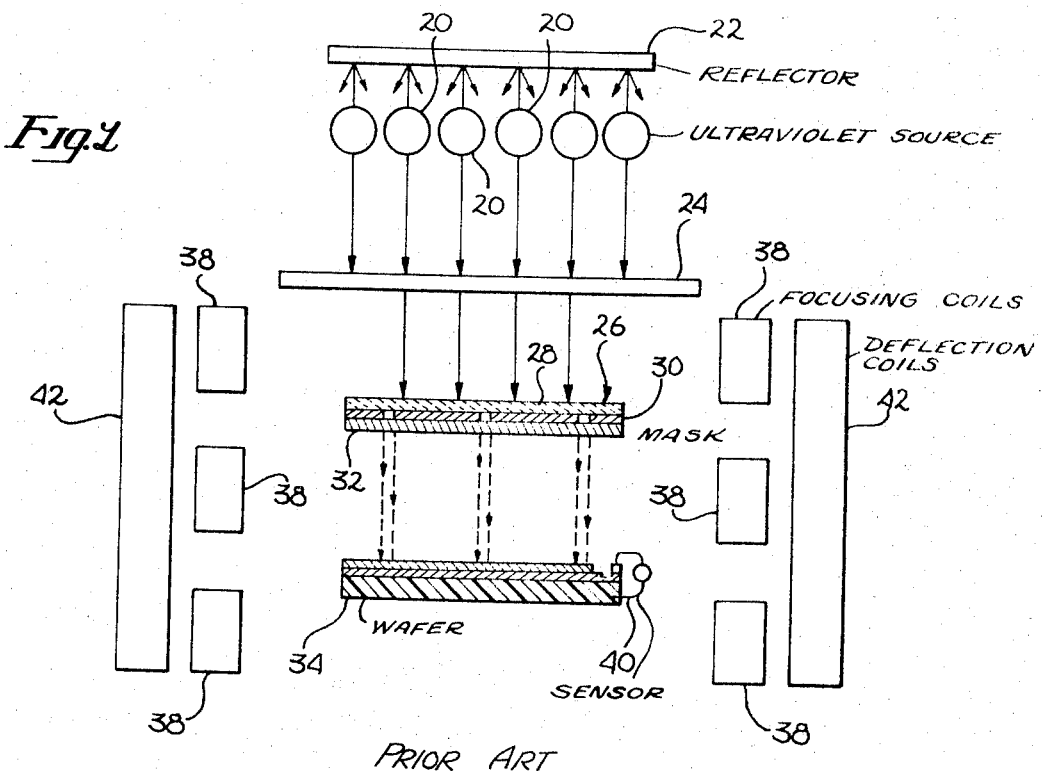
FIG. 1 is a schematic of the prior art electron image projection system.

First referring to FIG. 1, a schematic of an electron image projection system using the prior art image alignment method may be seen. Ultraviolet light sources 20, with a reflector 22, thereabove, direct ultraviolet light through an ultraviolet transmitting window 24 onto the mask, generally indicated by the numeral 26. The mask is comprised of a quartz place 28 having a patterned layer of titanium dioxide 30 on the lower surface thereof and a thin layer of palladium 32 deposited thereover. When the palladium is irradiated with ultraviolet light, electrons are emitted having an energy of approximately 0.2 electron volts. However, in those regions of the mask having the intermediate layer of titanium dioxide, no electrons are emitted from the palladium since the titanium dioxide prevents the irradiation of the palladium by the light. Consequently, electrons are emitted from the lower surface of the mask 26 in a pattern which is, in essence, the negative of the titanium dioxide pattern.

The electrons are accelerated through an electric field to the wafer, generally indicated by the numeral 34. In general, the wafer 34 will be a semiconductor wafer which may have various layers of oxides and/or metal thereover, and an outer layer of an electron resist material. By way of example, a suitable electron resist material is polymethyl methacrylate which depolymerizes when struck by an electron beam. This type of resist is a positive resist in which the parts of the pattern struck by the electrons, that is, the depolymerized part, is removed by use of a solvent. The electron resist material remaining after development has the same pattern as the titanium dioxide pattern on the mask 26 (that is, a positive image is created). For focusing the electron image, a series of focusing coils 38 are provided around the production system. Also provided is a sensor, generally indicated by the numeral 40, for sensing the alignment of the projected image with respect to the wafer 34 and for determining the control to be applied to the deflection coils 42, generally disposed around the image projection area, to align the projected image with the reference mark at the edge of the wafer.

Figure 2A:
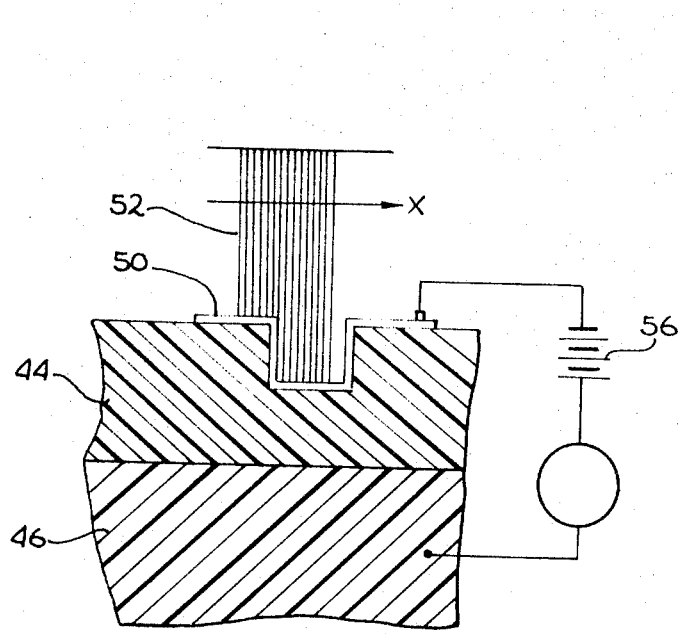
FIG. 2a is a schematic representation of the electron beam sensor used in the prior art system of FIG. 1.
Figure 2B:
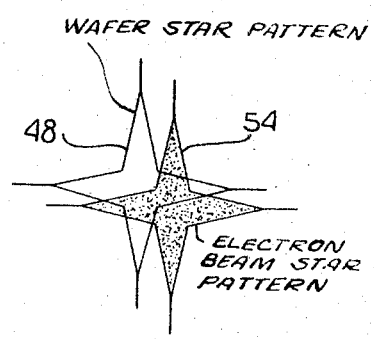
FIG. 2b is a top view of the sensor of FIG. 2a showing the star pattern of the sensor and of the electron beam used to scan the sensor.

The manner of determining the proper alignment of the electron image with the substrate 34 is illustrated in FIGS. 2a and 2b. At a position at the edge of the silicon wafer 34 is a layer of silicon oxide 44 on the silicon substrate 46. A star pattern 48 is etched into the surface of the oxide layer 44 of reduced oxide layer thickness. A very thin layer of aluminum 50 is then deposited over the star pattern 48 and the area of the oxide layer 44 surrounding the star pattern and electrical contact is made to the silicon wafer 46 and the aluminum layer 50. Prior to the exposure of the electron resist with the electron image, the edge of the wafer 34 is first irradiated with an electron beam 52 having a star pattern 54, and a voltage is applied between the aluminum layer 50 and the silicon substrate 46 by a voltage source 56. The electron beam partially passes through the aluminum layer 50 and irradiates the oxide layer 44 therebelow. This induces a conductivity in the oxide layer which is substantially inversely proportional to the thickness of the oxide layer. Consequently, the electron beam 52 may be aligned with the star pattern 48 in the oxide layer 44 by sensing the conductivity of the oxide layer by measuring the current flowing between the aluminum layer 50 and the silicon substrate 46 and adjusting the deflection coil 42 so as to maximize the current flow. The use of the star pattern assures some initial overlap of the projected image with the star pattern in the oxide layer, and further, provides an angular reference as well as a translational reference.

The problem with the prior art alignment method is that each article processed must have an oxide layer in the region of the reference mark very accurately etched to provide the star pattern 48, a thin layer of aluminum uniformly deposited thereover and electrical contacts both to the aluminum and to the silicon substrate itself in order for the alignment method to function satisfactorily. Any failure of the electrical contacts or degradation in the alignment pattern of the aluminum layer, etc., will result in the inability to properly align the electron image to the wafer 34, thereby resulting in loss of the entire wafer at the stage of the processing. Further processing of the wafer destroys the aluminum contact thereon. Certain processing steps such as epitaxial growth obliterate the star patten, also making subsequent alignment impossible.

Figure 3:
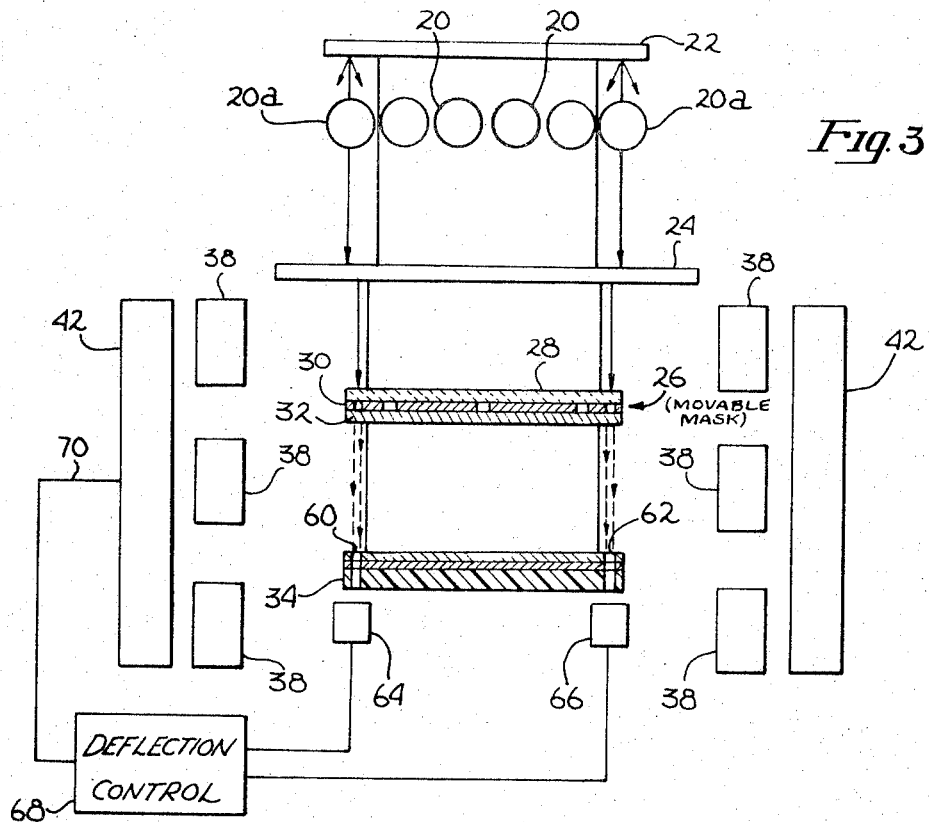
FIG. 3 is a schematic of the electron image alignment system of the present invention.

Now referring to FIG. 3, a preferred embodiment of the present invention may be seen. In this embodiment, the ultraviolet light source 20 is adapted to eliminate the functional area of the mask, and ultraviolet light sources 20a are adapted to illuminate only the edge of mask 26 in two substantially diametrically opposed regions. The mask 26 is adapted to project two small electron beams toward the edge of the wafer 34, and the wafer in turn is provided with holes 60 and 62 through which the electron beams may project to sensors 64 and 66 located therebelow. Sensors 64 and 66 are adapted to intercept the electron beams when the beams are directed through the holes in the wafer and to provide an output signal indicative of the presence of absence of the electron beams passing through the holes. The deflection control 68 receives the signal from sensors 64 and 66 and controls the signal applied to the deflection coils (generally indicated by line 70) so as to first control the deflection of the two small electron beams so as to scan the region of the alignment holes in the wafer to determine the true position or location of the alignment holes in the wafer, and then to determine a fixed deflection coil signal so as to properly align the electron image projected onto the wafer with respect to the reference holes in the wafer.

The sensors 64 and 66 may be any convenient sensors for sensing the presence of an electron beam. However, inasmuch as the current density in the electron beams will be on the order of 10 microamps per square centimeter and the area of each beam will be on the order of 10 to $100 \times 10^{-6}$ square centimeters, it is most desirable to use sensors having a relatively high sensitivity. Suitable sensors may include resistive devices rendered more conductive by irradiation from an electron source, and electron radiation multiplier devices similar to the well-known photomultiplier tubes. Of course, in photomultiplier tubes, the initial electron emission is caused by illumination of the photocathode, with a multiplication of the number of emitted electrons by many orders of magnitude as a result of secondary emission from a series of plates in the tube. The sensor suitable for use as sensors 64 and 66 do not have a photosensitive electron emitter (e.g., photocathode), but simply use the secondary emission from a plate exposed to the electron beam as the initial source of electrons in the multiplying device.

Figure 4:
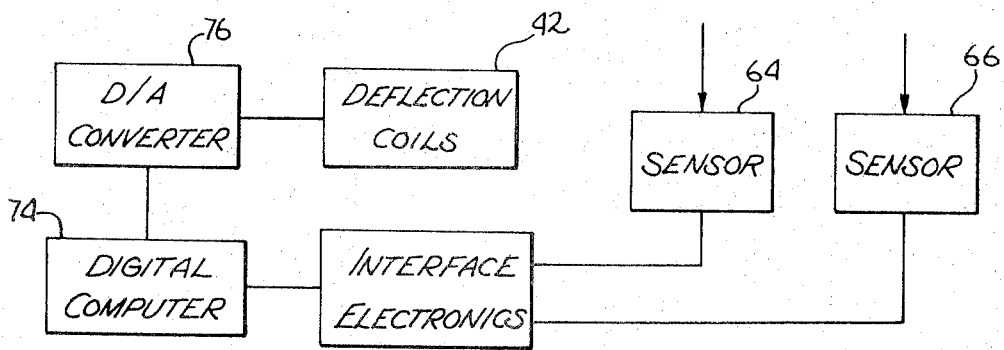
FIG. 4 is a block diagram of the electron image alignment system of FIG. 3.

The size of the reference holes 60 and 62 in the wafer, the manner of scanning the holes 60 and 62 with the electron beams and the method and apparatus used to analyze the information received from the sensors 64 and 66 may vary considerably depending on the application and the specific equipment available for use for this purpose. By way of example, a digital computer may be used as the heart of the deflection control 68, as shown in FIG. 4. In this figure, the sensors 64 and 66 provide a signal to the interface electronics 72 which transfers information to the digital computer 74 for analysis. The digital computer in turn provides a digital output, which is converted to an analog signal by the digital to analog converter 76, for control of the deflection coils 42. The interface electronics 72 is a means adapted to sense and to provide information to the digital computer each time either sensor 64 or sensor 66 initially detects or stops detecting the electron beam (or on the next computer clock pulse thereafter). Thus, since the digital computer 74 itself controls the deflection coils, the digital computer may determine the location of the edge of each of the alignment holes 60 and 62 in terms of the deflection coil signal. From this edge information the computer may then determine in terms of the deflection coil signals the true centers of the alignment holes.

Figure 5:
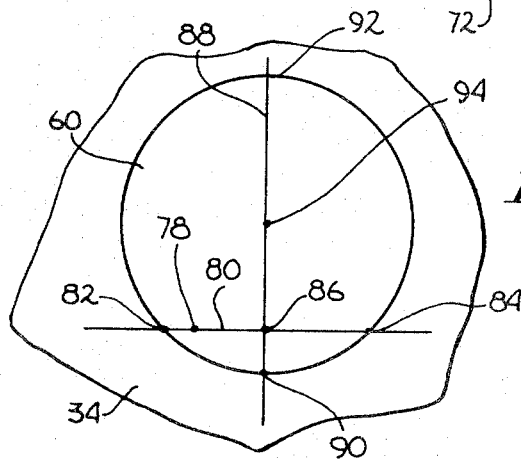
FIG. 5 is a top view of one of the alignment holes illustrating one possible electron beam scan sequence for determining the position of the center of the alignment hole.

In such a system with no deflection coil signal, the electron beams may or may not initially be directed through the alignment holes 60 and 62, depending upon the extent of mechanical alignment between the mask 26 and the wafer 34 and the size of the alignment holes. If the electron beams are not initially aligned so as to pass through the alignment holes, the computer 74 would be programmed to first generally scan the area in which the holes should be located until each of the electron beams has passed through some area of the associated alignment holes at least once. Then the computer may determine deflection coil signals so as to cause the electron beams to pass through both alignment holes (though undoubtedly not through the center of the holes). Once this is accomplished, the scanning of each hole may proceed to determine the location of the center of the holes as illustrated in FIG. 5. In this figure, the hole 60 and a portion of the substrate 34 is shown with one possible beam scan that may be used. Assume that the initial beam position, with respect to the hole, is at point 78. The computer is programmed to first deflect the beam back and forth along a first line 80 so as to intercept the edges of the hole at points 82 and 84. From this information, the computer may determine a point mid-way between points 82 and 84, that is, point 86. The next step is to deflect the beam back and forth through point 86 along line 88 so as to intercept the edges of the hole at points 90 and 92. From this information, the mid-point 94 between points 90 and 92 may be determined by the computer. (This same scanning may be done simultaneously for both holes.) If the alignment hole is perfectly round, and no sensing errors exist, point 94, as determined by these two sweeps, is the true center of the alignment hole. Thus, the deflection coil signal equivalent to causing the two electron beams to pass through the centers of the alignment holes will be the proper deflection coil signals for alignment of the electron image on the electron resist. However, because the alignment holes 60 and 62 may not be perfectly round and there may be sources of error such as electronic noise in the system, greater accuracy may be achieved by repeated scanning to determine the mid-point of the scan lines along a plurality of lines not necessarily orthogonal to each other, such as, by way of example, along lines inclined in 30 degrees increments. Once the center of holes 60 and 62 are determined, a deflection coil signal will be determined which automatically aligns the electron image (mask) and the wafer. Since the scanning and the computation may be done extremely quickly, the time involved in automatically aligning the mask in this manner is substantially insignificant compared to the required exposure time for the electron resist of approximately 10 seconds.

Figure 8:
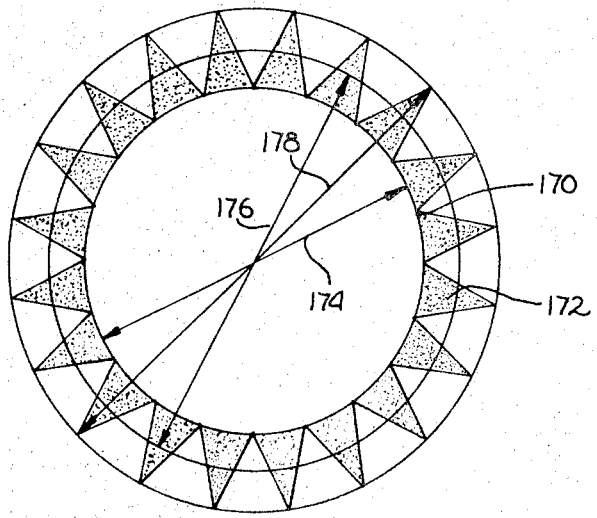
FIG. 8 is a cross-section of an electron beam having a high average beam intensity at the inner diameter of the annular area.

In the above described method, an electron beam spot size is used which is small in comparison with the size of the alignment hole and signals are derived from the sensors, generally in the form of switching signals, indicating either the reception of the electron beam or the lack of reception thereof. As an alternative to the above, an electron beam size on the order of the size of the alignment holes may be used, and the amplitude of the signal received from the sensors used to determine the relative amount of overlap between the beams and the alignment holes. By way of example, a circular electron beam equal in size to the alignment hole may be used. Thus, maximum signal intensity would be achieved when the beam is concentric to the alignment hole. If, however, the beam were slightly smaller than the alignment hole, the variation in signal intensity versus eccentricity between the beam and the alignment hole would have a flat region for very small eccentricities and, therefore, would be substantially insensitive to small changes in eccentricity near the perfectly aligned condition. One method of avoiding this problem is to always cause the electron beam to scan back and forth at a relatively high frequency in the two orthogonal directions by an amount which is a fraction of the diameter of the beam and the alignment holes, and to compare the amplitude of the signal received at each end of the sweep. This allows the use of the portion of the signal amplitude versus beam-alignment hole eccentricity having the greatest slope, so that the sensitivity will be much higher in the sensing system and great care need not be taken to assure that the beam size is exactly the same as the alignment hole size. Furthermore, such a scheme allows a choice in the beam pattern which will tend to maximize the slope of the beam-alignment hole eccentricity curve so as to further increase the sensitivity of this method. By way of example, the beam might be characterized by a central region, say approximately 90 percent of the diameter of the alignment hole, having a uniformly high intensity, with the intensity decreasing along the radius of the pattern from the central high intensity region to substantially zero at a diameter which is approximately 110 percent of the nominal alignment hole size. Such a beam pattern, when caused to scan a distance of approximately 10 percent of the diameter of the alignment hole, will exhibit a high change in the output signal of the sensor at the end points of the scan for small changes in the eccentricity between the center of the scan and the center of the alignment hole, while at the same time allowing moderate variation in the alignment hole size without causing a loss in sensitivity. This pattern, however, is not the preferred beam pattern in that the central region of high beam intensity causes a high quiescent output signal which may tend to saturate the sensor and associated electronics, and further, smooth variation in beam intensity is not a readily achievable beam characteristic. The first problem may be overcome by eliminating the central area of high beam intensity, thereby using a pattern which may be at least generally characterized as an annular pattern overlapping the circumference of the alignment hole having a high intensity at the inner diameter thereof, and decreasing in some predetermined manner to allow or substantially zero intensity at the outer radius thereof. This may be achieved by using a sort of saw tooth pattern as shown in FIG. 8. This pattern is characterized by a central area 170 of substantially zero intensity with a plurality of approximately triangular areas 172 of high intensity adjacently disposed so that their bases define the inner diameter 174. by using a sufficient number of triangular areas 172, the pattern may be made to approximate the characteristic of a pattern having a purely radial variation in beam intensity, as hereinabove described, since the beam has a high average intensity adjacent the inner diameter and a low average intensity adjacent the outer diameter 178.

Figure 9:
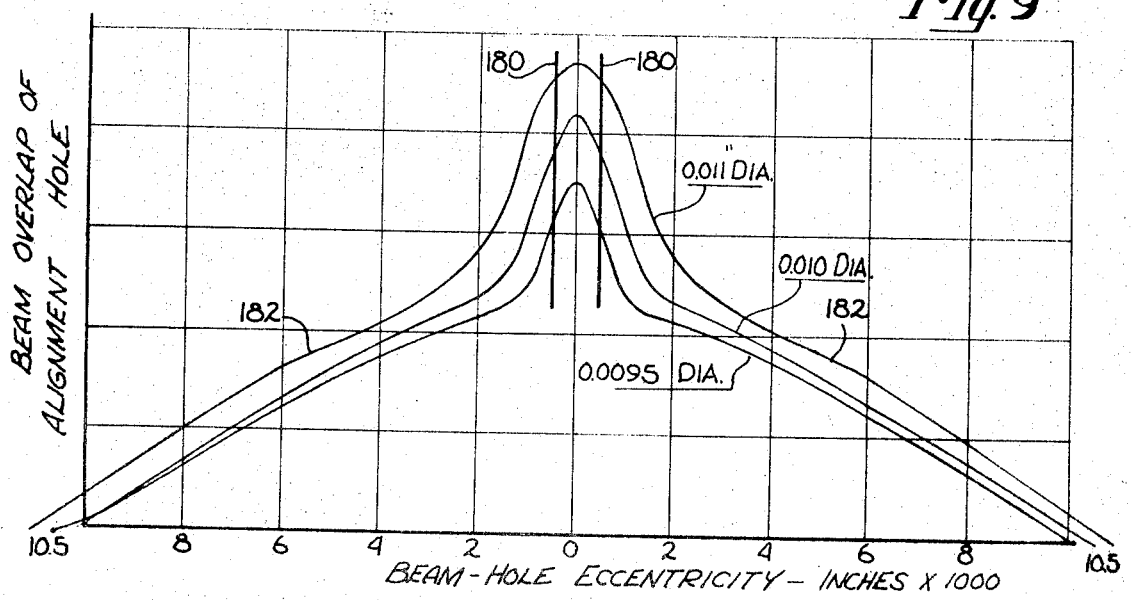
FIG. 9 is a graph showing relative amount of beam overlap of an alignment hole versus beam-hole eccentricity for three sizes of alignment holes.

Also super-imposed on the beam pattern of FIG. 8 is the nominal alignment hole diameter 176, and for reference, a diameter 178 defined by the tips of the triangular areas 172. In the preferred embodiment, 24 triangular areas 172 are used, having an inner diameter 174 of 0.008 inches and an outer diameter 178 of 0.011 inches. With such a pattern, a high sensitivity may be achieved at the end points of a sweep of approximately 0.001 inches in the beam with respect to the alignment hole, for alignment hole diameters ranging from 0.0095 inches to 0.011 inches. This is illustrated in FIG. 9, which is a graph showing the relative amount of beam overlap of the alignment hole versus beam-hole eccentricity for alignment hole sizes of 0.0095, 0.010 and 0.11 inches in diameter. It may be seen that all three curves have a high slope in an area approximately 0.0005 inches away from the maximum point of the curve, indicated by lines 180. Thus, a sweep of approximately 0.001 inches will cause the sensor output at the end points to be highly sensitive to the relative position between the center of the sweep and the center of the alignment hole, whereas the extending trails of each curve, generally indicated as the areas 182, have a reduced, but still sufficient, slope to provide sensor signals of a proper sense to indicate the direction of relative motion between the sweep and the alignment hole to achieve alignment. Also, it has been found desirable to initially scan with a greatly increased sweep, that is, with a sweep on the order of 0.010 inches, so as to sweep out a greater area to be certain that the sweep initially overlaps at least part of the alignment hole and to provide an increased difference in sensor signals at the two ends of the sweep for faster alignment and then to decrease the sweep to the order of 0.001 inches for the accurate alignment as hereinabove described.

It is to be understood that the above described scanning method and method of determining the center of the alignment holes from the data obtained is merely one example of the orderly scanning and processing of the scanned data by a digital computer to achieve the automatic alignment. Other scanning methods and data reduction techniques using the digital computer may also be used, the essential characteristics of such scanning being first the scanning of the general areas on the wafer containing the alignment holes so that the electron beams may be deflected to pass through the alignment holes, and secondly, the repeated scanning across the circumference of the alignment holes to obtain sufficient information from which the center of the holes may be determined. Of course, if the mechanical alignment and hole sizes are such that the undeflected electron beams will always initially fall somewhere within the alignment holes, the general area scanning described above may be omitted.

The above described system using a digital computer to control the scan and to determine the proper deflection coil signal for aligning the electron image with the wafer is particularly convenient and economical in those applications where a computer is used for other purposes and is, therefore, available for use in the mask alignment system of the present invention. However, it is to be understood that the deflection control 68 of FIG. 3 may be comprised as components other than a digital computer, with the proper deflection coil signal being determined either in analog or in digital form. By way of example, an analog or at least semi-analog scanning and automatic alignment method is illustrated in FIGS. 6a through 6d. In FIG. 6a, one of the alignment holes, that is, hole 60 in the wafer 34, is shown with the electron beam sweep, generally indicated by the numeral 100, for scanning the alignment hole superimposed thereover. As illustrated, the electron beam sweep 100 is a substantially square sweep path with each side of the sweep having a length of approximately 85 percent of the hole size. When the sweep path 100 is aligned with the hole 60, the length of the beam sweep path S1 within the top of the hole is equal to the beam path S3 at the bottom of the hole. Similarly, the path length S4 in the left side of the hole is equal to the path length S2 at the right side of the hole.

Now referring to FIG. 6b, the alignment holes 60 and 62 are shown schematically with the corresponding beam sweep paths 100a and 100b displaced therefrom in the vertical direction. In this figure it may be seen that the sweep paths S3 and S7 are substantially longer than the sweep paths S1 and S5, while the sweep paths S4 and S2 are the same length as the sweep paths S8 and S6. Consequently, a signal proportional to the sum of the length of the sweeps S3 and S7, minus the sum of the length of sweeps S1 and S5, may be used as an indication of the Y direction error in the position of the square sweep patterns with respect to the alignment holes. (It may be noted that if the misalignment is substantial, the length of the sweeps S1 and S5 will be zero, but still the above signal will properly indicate the Y direction error in the sweep positions.)

In a similar manner, it may be shown that a signal indicative to the X direction error is achieved by subtracting the sum of the lengths S2 and S6 from the sum of the sweep lengths S4 and S8. In FIG. 6c, an angular error between the square sweep pattern and the alignment holes is shown. Here it may be seen that a signal indicative of the angular misalignment between the sweep pattern and the alignment hole is achieved by subtracting the sum of the scan lengths S3 and S5 from the sum of the scan lengths S1 and S7. Thus, by proper combinations of the various sweep lengths falling within the alignment holes, signals indicative of the direction of the translational corrections and of the rotational corrections required to properly align the sweep patterns with the alignment holes may be obtained. Also, it may be readily demonstrated that these signals properly indicate the direction of the required translational and rotational corrections if any part of the square sweep patterns traverses any part of the two holes.

Now referring to FIG. 7 a block diagram of a system for automatically determining the translational and rotational deflection coil signals, that is, the X alignment signal, the Y alignment signal and the $\theta$ alignment signal, using the sweep scheme illustrated in FIGS. 6a through 6c, may be seen. A sweep generator 120 provides the X and Y deflection coil signals for the deflection coils 122 to carry out the square sweep pattern for the two alignment electron beams. The sweep generator signals are relatively high frequency signals (in the order of 10 kc), and are coupled to the deflection coils 122 through capacitors 124 and 126 which provide the desired high frequency coupling while simultaneously providing substantial dc and low frequency isolation for the deflection coils 122. Also shown is the coupling between sweep generator 120 and the deflection coils 122 through capacitor 128 for providing a $\theta$ or rotational deflection coil signal. In general, this coupling between the sweep generator and the deflection coil will be required only if the initial misalignment between the square sweep patterns and the alignment holes is such that one or both of the square sweep patterns do not intercept at least the edge of the holes and, in such case, the sweep generator would first go into a sweep mode to generally sweep the area of the alignment holes and align the square sweep patterns to intercept the holes in some manner, (e.g., sweep until one pattern intercepts a first hole, and then pivot the pattern for the second hole about the first hole until the second hole is intercepted also.) Also in such a case, a signal coupled from the sensors 66 and 68 to the sweep generator 120, such as through line 130, would be adapted to indicate sweep pattern intersection with the hole to switch from a general sweep into the alignment mode. The sensors 66 and 68 as previously described, sense the electron beams passing through the alignment holes and provide signals to the switching and coupling circuit 132, which is also adapted to receive a timing signal from the sweep generator 120 through line 134 so that the sensor signals may be identified as indicating the scans S-1 through S-8. The switching and coupling circuit is also adapted to combine and amplify the sensor signals so as to provide the desired outputs on lines 134, 136 and 138. The signal on line 134 is proportional to the length of the sweeps $S_2 + S_6 - S_4 - S_8$ and is obtained by selectively switching the output of sensors 66 and 68 into a differential amplifier having a reasonably low frequency response and amplifying the signals to obtain the desired output. The output on line 134 is filtered through the RC combination of resistor 140 and capacitor 142 and is then resistively coupled through resistor 144 to the X deflection coil in the deflection coils 122. The filter comprises of capacitor 142 and resistor 140 limits the signal applied to the deflection coil 122 from the switching and coupling circuit to dc and low frequency components, whereas the coupling resistor 144, in combination with the sweep generator coupling capacitor 124, allows high frequency control of the deflection coils 122 by the sweep generator. Consequently, the switching and coupling circuit 132 controls the dc and low frequency components (typically 50 cycles per second and lower) applied to the deflection coils 122, that is, the average or dc alignment signal, with the sweep generator 120 superimposing on the dc value the high frequency square sweep pattern.

Similarly, the ouput on line 136 is proportional to the sweep lengths $S_1 + S_5 - S_3 - S_7$, and is coupled to the Y deflection coil in the deflection coils 122 through the RC filter comprised of resistor 146 and capacitor 148 and through the coupling resistor 150. The output on line 138 is made proportional to the scan lengths $S_1 + S_7 - S_3 - S_5$, and is coupled to the $\theta$ or rotational deflection coil in deflection coils 122 through RC filter comprised of resistor 152 and capacitor 154 and through coupling resistor 156. Thus, the sweep generator 120 causes the high frequency square sweep pattern, as illustrated in FIGS. 6a through 6c, to be applied to the deflection coils 122, while the switching and coupling circuit coupled to the sweep generator and to the sensors 66 and 68 combines the sensor signals in response to the sweep generator signals so as to provide low frequency deflection coil signals indicative of, and of a proper polarity, to cause the average deflection coil signals to be those required for proper alignment of the electron image. Thus, the signals appearing at points 160, 162 and 164 are the deflection coil signals to provide proper X alignment, Y alignment and $\theta$ alignment, respectively, for the deflection coils 122, and may be stored either in analog form, such as by means of an electro-mechanical follow-up system, or may be converted to digital form by an analog to digital converter and stored in a register for subsequent re-conversion to analog form for control of the deflection coils during the exposure of the electron resist. (In general, additional filtering is provided for providing low noise signals for signals 160, 162 and 164.)

Once the alignment is achieved, which typically will taken no more than one second, the deflection coils 122 will be disconnected from the rest of the system shown in block diagram of FIG. 7 and will be connected to a deflection coil signal generator adapted to apply signals to the deflection coils 122, equal to the signals measured at points 160, 162 and 164 during the alignment phase.

In the above described method, the size of the square sweep pattern, in comparison to the size of the alignment holes, is an important parameter. If the sides of the square sweep pattern are less than approximately 70 percent of the diameter of the alignment holes, the entire square sweep pattern will fit within the circumference of an alignment hole. On the other hand, if the sides of the square sweep pattern are equal to or larger than the diameter of the alignment hole, the alignment hole will fall entirely within the square sweep pattern. Consequently, for best results the sides of the square sweep patterns should be approximately 85percent of the diameter of the alignment holes. As an alternate, a triangular sweep pattern may be used, with suitable cross-coupling networks determining the orthogonal X and Y deflection coil signals from the non-orthogonal sweep direction signals. As a further alternate method, the sweep generator 120 may be adapted to sweep in an orthogonal X pattern and to provide proper information to the switching and coupling circuit 132 so that the sensor signals may be combined in a manner similar to that heretofore described so as to determine the alignment signals for proper alignment of the electron image. The triangular sweep pattern allows a greater variation in sweep pattern size for a given alignment hole size, while the orthogonal X pattern may be used with a wide range of alignment hole sizes.

In the above-described electron image alignment methods and apparatus, electron beams are used to sweep the alignment holes in the article to which the electron image is to be aligned and electron beam sensors located under the alignment holes are used to detect the passage of the electron beams through the alignment holes. However, it is to be understood that other means of scanning the alignment holes and other forms for the sensors 66 and 68 may be used with the present invention. By way of example, sensors 66 and 68 may be photo-sensors with the scanning of the alignment holes being done with light beams rather than electron beams. In this embodiment, the mask would be provided with transparent alignment windows accurately aligned with respect to the mask pattern, and would be illuminated from above in the region of the alignment windows so as to project light beams toward the reference holes in the wafer. Since the light beams may be electrostatically or electromagnetically deflected, other scanning and alignment apparatus must be used. One method of scanning the wafer is to mechanically move the wafer with respect to the alignment beams so as to scan the hole with the beams in a predetermined manner. Another method is to mechanically cause the mask to move so as to cause the light beam to scan the alignment holes. Either of these methods may be adapted to use the scanning schemes and beam intensity characteristics hereinbefore described to result in the accurate alignment of the electron image on the wafer.

Figure 10:
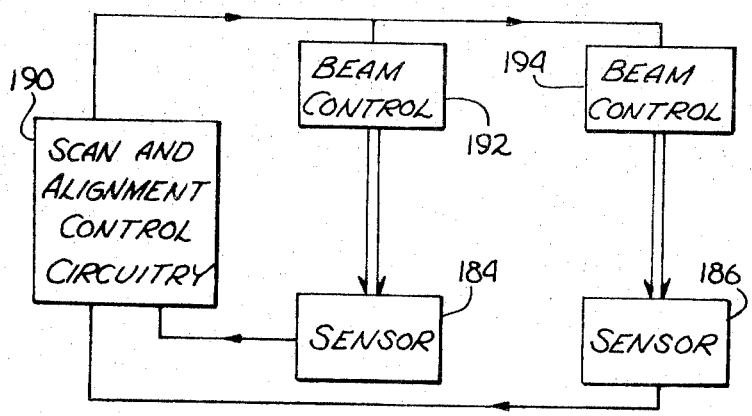
FIG. 10 is a generalized block diagram of the system of the present invention.

As a further alternative, it should be noted that electromagnetic translation of an electron beam image without substantial distortion of the image is readily achieved, whereas rotation of an image by electromagnetic deflection techniques is difficult, and rotation only over a very limited angle may be achieved without causing distortion of the image. Therefore, a system utilizing electromagnetic beam deflection for the X and Y translation of the beams (and electron image) and using mechanical rotation of the mask for angular alignment of the beams, has been found particularly useful, allowing substantial, yet accurate, beam deflection in both the translational and rotational senses. Thus, in the most general sense, the present invention may be illustrated in block diagram form as shown in FIG. 10. Sensors 184 and 186 sense the alignment holes in the wafer and provides signals to the scan and alignment control circuitry 190 which in turn commands to the beams controls 192 and 194. The beams controls may be electrostatic and/or electromagnetic control of electron beams, or may be mechanical control of beams (such as, but not limited to, electron beams and light beams) or may be a combination of electrical and mechanical control of the beams through control of the beams themselves and/or through control of the position of the mask or wafer so as to result in the desired alignment. Thus, while the invention has been particularly shown and described with reference to preferred embodiments thereof, it will be understood by those skilled in the art that various changes may be made therein without departing from the spirit and scope of the invention.

We claim:

1. An electron image alignment system for use with a photocathode having a first region for projection of at least one electron image thereon and having at least two second regions for projection of reference electron beams therefrom, and an article on which the image is to be projected having alignment holes in substantially the same pattern as said second regions, comprising:
    means for illuminating said second regions of said photocathode so as to cause photoemission of electrons therefrom;
    means for accelerating electrons emitted from said second regions toward said article;
    deflection means for deflecting said beams and said electron image responsive to a deflection signal;
    sensing means for sensing the passage of each of said beams through said alignment holes; and
    means coupled to said deflection means and said sensing means for controlling said deflection means and for determining the position of the centers of said alignment holes, in terms of deflection signals, from information regarding scanning beam positions for a plurality of intersections of said beams with said holes, whereby the electron image impinging on said article will be aligned with respect to said reference holes when said first region on said photocathode is illuminated.

2. The system of claim 1 further comprised of an interface means coupled to said sensing means for indicating the intersection of the sweep of each of said beams with the edge of said alignment holes, said means coupled to said scanning means and said sensing means being coupled to said sensing means through said interface means whereby the centers of said alignment holes may be determined from the scanning beams positions for a plurality of beams intersections with the edge of said holes.

3. A method of aligning an electron image to be emitted by a photocathode mask with respect to alignment holes in an article on which the electron image is to be projected comprising:
    a. illuminating a portion of said photocathode mask to cause reference electron beams to be projected from the photocathode mask toward the alignment holes in said article and causing said beams to scan said holes, using electron beams having an annular area characterized by a high average intensity adjacent the inner diameter of said annular area which is smaller than the nominal diameter of said alignment holes, and a low average intensity adjacent the outer diameter of said annular area which is larger than the nominal diameter of said alignment holes,
    b. sensing the passage of said electron beams through said holes by sensors,
    c. determining from the information sensed in step (b) the scan position which causes said beams to be aligned with the center of said alignment holes.

4. The method of claim 3 wherein said electron beams are caused to scan in two directions a fraction of the diameter of said alignment holes and the scan position which causes said beams to be aligned with the centers of said alignment holes in determined by changing the center position of the beam scans until the magnitude of the beams passing through said alignment holes sensed by said sensors adjacent each end of said scans are substantially equal.

5. The method of claim 4 wherein a first scan length is used for rough alignment and a second scan length substantially less than said first scan length is used for final alignment.

6. A method of aligning an electron image to be emitted by a photocathode mask with respect to alignment holes in an article on which the electron image is to be projected comprising:
   a. illuminating a first portion of the photocathode mask to cause reference electron beams to be projected from the photocathode mask generally toward the alignment holes in said article,
   b. causing said beams to scan said holes by control of a deflection signal applied to a deflection means,
   c. sensing the passage of said electron beams through said holes by sensors,
   d. determining from the information sensed in step (c) deflection signals which cause said beams to be aligned with the centers of said alignment holes,
   e. illuminating a second portion of the photocathode mask to cause the electron image to be projected onto said article while maintaining the deflection signal determined in step (d).

7. An electron image alignment system comprising:
   scanning means for scanning with beams at least two alignment holes in the article on which the image is to be projected;
   sensing means for sensing the passage of each of said beams through said alignment holes and providing an output signal responsive thereto;
   means coupled to said scanning means and said sensing means for determining the electron image alignment with respect to said holes from information regarding scanning beam position and sensing means output signal; and
   said beams being confined to a substantially annular area having an inner diameter less than the nominal diameter of said alignment holes and an outer diameter greater than the nominal diameter of said alignment holes, said beams being characterized as having a high average intensity in the area adjacent said inner diameter, which decreases with increasing diameter to a low average intensity in the area adjacent said outer diameter.

8. The image alignment system of claim 7 wherein each of said beams is comprised of a plurality of approximately triangular shaped beam areas adjacently disposed with their bases defining said inner diameter of said annular area and their apexes together defining the outer diameter of said annular area.

9. The image alignment system of claim 7 wherein said beams are electron beams.

10. The image alignment system of claim 7 wherein said beams are light beams.

11. The image alignment system of claim 7 wherein said scanning means is a means for scanning each of said alignment holes in at least two directions with a scan length which is decreased from a maximum scan length for rough scanning and aligning to a substantially shorter scan length for final alignment.

12. The image alignment system of claim 11 wherein said means coupled to said scanning means and said sensing means for determining the electron image alignment is a means for comparing the sensing means signals occurring near the ends of each scan and for changing the average position of said scan to cause said sensing means signals occurring near the ends of each scan to be substantially equal.

13. The electron image alignment system of claim 7 wherein said beams are electron beams and said scanning means comprises an electron deflection means for translating said beams and for rotating said beams about an axis.

14. The electron image alignment system of claim 13 wherein said deflection means is an electromagnetic deflection means.

15. The electron image alignment system of claim 7 wherein said beams are electron beams and said scanning means comprises a deflection means for translating the impingement of said electron beams and a means for mechanically causing relative rotation between the source of said electron beams and said article on which the image is to be projected.

16. An electron image alignment system for aligning a projected electron image comprising:
   means for causing at least two electron beams aligned with an electron image projection means to be directed toward the surface of an article on which as electron image is to be projected said article having at least two alignment holes therethrough;
   means responsive to deflection signals for deflecting said electron beams in a controllable manner, said last named means also being operative to deflect a projected electron image accordingly;
   sensing means located under said alignment holes for determining the passage of each of said electron beams through a corresponding one of said alignment holes; and
   means coupled to said sensing means and to said means responsive to deflection signals for generating deflection signals to cause said electron beams to scan the regions of said article having said alignment holes therein, and for determining the positions of said alignment holes in terms of deflection signals from the scan positions for the intersection of said beams with said holes.

17. The system of claim 16 further comprised of an interface means coupled to said sensing means for indicating the intersection of the sweep of each of said beams with the edge of said alignment holes, said means coupled to said sensing means and said means responsive to deflection signals being coupled to said sensing means through said interface means, whereby the position of said alignment holes may be determined from the scanning beam positions for a plurality of beam intersections with the edge of said holes.

18. An electron image alignment system for aligning an electron image on an article with respect to alignment holes in the article comprising:
   a photocathode mask adapted to emit an electron image when illuminated in a first area and to emit electron beams when illuminated in a second area, said electron beams having an inner diameter less then the nominal diameter of said alignment holes and outer diameter greater than the nominal diameter of said alignment holes, said beams being characterized by a high average intensity in the area adjacent said inner diameter which decreases with increasing diameter to a low average intensity in the area adjacent said outer diameter;
   a sensor located below each of said alignment holes responsive to the intensity of an electron beam passing therethrough caused by illumination of said photocathode mask in said second area;
   beam control means for causing relative translation and rotation of the pattern of said electron beams with respect to said article; and means coupled to each said sensor and to said beam control means to cause said electron beams to scan said alignment holes in a pre-determined manner and to determine the relative position of said article and said electron beams so that the center of scan of said electron beams is coincident with the center of said alignment holes.

19. The electron image alignment system of claim 18 wherein said means coupled to each said sensor and to said beam control means to cause said electron beams to scans said alignment holes is a means for mechanically rotating said photocathode mask with respect to said article and an electromagnetic means for causing substantially linear translation of said electron beams and said electron image with respect to said article.

20. The electron image alignment system of claim 19 wherein said means coupled to each said sensor and to said beam control means to cause said electron beams to scan said alignment holes comprises a means to cause said electron beams to scan said alignment holes in at least two directions with a scan length which is decreased from a maximum scan length for rough scanning and aligning to a substantially shorter scan length for final alignment.

21. The electron image alignment system of claim 20 wherein said last named means further comprises a means for comparing the sensor signals occurring near the ends of each scan and for changing the average position of said scan to cause said sensor signals occurring near the ends of each scan to be substantially equal.

* * * * *